United States Patent Office 2,776,294
Patented Jan. 1, 1957

---

2,776,294

TROPIC ACID N-(γ-PICOLYL)-AMIDE

Gérald Rey-Bellet and Hans Spiegelberg, Basel, Switzerland, assignors to Hoffmann-La Roche Inc., Nutley, N. J., a corporation of New Jersey No Drawing. Application January 24, 1955,
Serial No. 483,812

Claims priority, application Switzerland March 5, 1954

The portion of the term of the patent subsequent to December 6, 1972, has been disclaimed

2 Claims.  (Cl. 260—295)

This invention relates to novel chemical compounds and to novel processes for the preparation thereof. In one of its aspects, the invention relates to tropic acid-N-(γ-picolyl)-amide and acid addition salts thereof. In another of its aspects, the invention relates to a process which comprises reacting O-acetyl-tropic acid halide (e. g. O-acetyl-tropic acid chloride or O-acetyl-tropic acid bromide) with γ-aminomethyl-pyridine, and hydrolyzing off the O-acetyl group in the condensation product. In still another aspect, the invention relates to a process which comprises reacting a tropic acid halide (e. g. tropic acid chloride or tropic acid bromide) with γ-aminomethyl-pyridine.

The novel compound tropic acid-N-(γ-picolyl)-amide has the following structural formula:

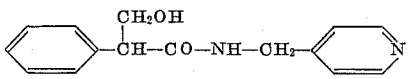

This compound and its acid addition salts are useful as medicinals, more particularly as spasmolytic compounds, in virtue of their atropine-like action.

The invention is further disclosed in the following example, which is illustrative but not limitative thereof:

*Example*

To a mixture of 31 g. of γ-aminomethyl-pyridine and 23 g. of dry pyridine in 100 g. of dry chloroform was added slowly, while stirring and while cooling with ice water, the total amount of O-acetyl-tropic acid chloride obtained by acetylation of 50 g. of tropic acid and subsequent chlorination by means of excess thionyl chloride. At the conclusion of this operation, the reaction mixture was stirred for an additional hour at 20° C.

The chloroform solution obtained, containing O-acetyl-N-(γ-picolyl)-amide hydrochloride, was then diluted with 150 g. of diethyl ether and extracted with 3 N aqueous hydrochloric acid solution, taking care that the extract was acid to congo. The acid extract was heated for one hour on a steam bath, thereby splitting off the acetyl group from the condensation product and resulting in the formation of tropic acid-N-(γ-picolyl)-amide hydrochloride. After addition of activated charcoal, the reaction mixture was filtered and reacted with excess concentrated aqueous ammonia. The tropic acid-N-(γ-picolyl)-amide thereby precipitated was taken up in chloroform, the chloroform solution was dried, and the chloroform was distilled off.

Upon recrystallization of the distillation residue from a mixture of ethanol and low boiling petroleum ether, there was obtained tropic acid-N-(γ-picolyl)-amide in the form of colorless crystals having a melting point of 143–144° C.

The same compound can be made by adding tropic acid chloride (that amount obtained from 166 g. of tropic acid by reaction thereof with excess thionyl chloride) dropwise to a solution of 93 g. of γ-aminomethyl-pyridine and 100 g. of dry pyridine in 750 g. of dry chloroform, while cooling to keep the temperature below 20° C. The product can be isolated by dilution of the reaction mixture with diethyl ether, extraction with dilute aqueous hydrochloric acid and neutralization with a base, as described above.

The base tropic acid-N-(γ-picolyl)-amide can be converted to an acid addition salt thereof by neutralization with the desired acid. Particularly preferred are nontoxic acids of the type usually employed in medicinals, e. g. hydrochloric acid, hydrobromic acid, tartaric acid, ethanesulfonic acid and the like.

We claim:

1. A compound selected from the group consisting of tropic acid-N-(γ-picolyl)-amide and its acid addition salts.
2. Tropic acid-N-(γ-picolyl)-amide.

References Cited in the file of this patent

UNITED STATES PATENTS 2,320,497   Wenner _____ June 1, 1943
2,726,245   Rey-Bellet _____ Dec. 6, 1955

OTHER REFERENCES

Fromherz et al.: Chem. Abst., vol. 42, cols. 8956–7 (1948).